US009568613B2

United States Patent
Droba et al.

(10) Patent No.: US 9,568,613 B2
(45) Date of Patent: Feb. 14, 2017

(54) METHOD, SYSTEM AND APPARATUS FOR PROVIDING AN ELECTRONIC SIGNAL FOR THE SURVEILLANCE AND TESTING OF GEIGER-MULLER RADIATION SENSORS

(71) Applicants: Gregory S. Droba, Wilmington, NC (US); Oscar L. Meek, Wilmington, NC (US)

(72) Inventors: Gregory S. Droba, Wilmington, NC (US); Oscar L. Meek, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 14/750,169

(22) Filed: Jun. 25, 2015

(65) Prior Publication Data

US 2016/0377739 A1    Dec. 29, 2016

(51) Int. Cl.
*G01T 1/18* (2006.01)
*G01M 3/40* (2006.01)
*H01J 47/08* (2006.01)

(52) U.S. Cl.
CPC ............ *G01T 1/18* (2013.01); *G01M 3/40* (2013.01); *H01J 47/08* (2013.01)

(58) Field of Classification Search
CPC ............. G01T 1/185; G01T 1/18; H01J 47/08
USPC ................ 250/252.1, 374, 375, 386, 387
See application file for complete search history.

(56) References Cited

U.S. PATENT DOCUMENTS

| 4,292,539 | A | * | 9/1981 | Todd | ............... G01T 1/18 250/374 |
| 5,180,917 | A | * | 1/1993 | Wraight | ............ G01T 1/185 250/252.1 |
| 8,080,807 | B2 | * | 12/2011 | McCormick | ........ G01T 1/18 250/374 |
| 2006/0065825 | A1 | | 3/2006 | Ishitsu et al. | |
| 2010/0051818 | A1 | | 3/2010 | De Geronimo | |
| 2015/0199793 | A1 | * | 7/2015 | Venkataraman | ....... G06T 9/00 382/239 |

FOREIGN PATENT DOCUMENTS

GB    2256042 A    11/1992

OTHER PUBLICATIONS

Lacerda, Fabio, et al., "Modular Remote Radiation Monitor," 2013 International Nuclear Atlantic Conference—INAC 2013, Recife, PE, Brazil, Nov. 24-29, 2013, pp. 1-7.
Partial International Search Report mailed on Nov. 7, 2016 for corresponding application No. PCT/US2016/034114.

* cited by examiner

*Primary Examiner* — Yara B Green
(74) *Attorney, Agent, or Firm* — Harness, Dickey & Pierce, P.L.C.

(57) ABSTRACT

A method, system and/or apparatus for remotely monitoring the operation of a radiation sensor may include a radiation sensor configured to detect a presence of radiation in the area, the radiation sensor including a Geiger-Muller tube, a test signal generator configured to generate a high frequency test signal used to test the radiation sensor, the high frequency test signal transmitted to the radiation sensor, and a test signal detector configured to detect a response of the radiation sensor to the test signal, and determine whether the radiation sensor is operating correctly.

20 Claims, 3 Drawing Sheets

METHOD, SYSTEM AND APPARATUS FOR PROVIDING AN ELECTRONIC SIGNAL FOR THE SURVEILLANCE AND TESTING OF GEIGER-MULLER RADIATION SENSORS

BACKGROUND

Field

The present disclosure relates to methods, systems and/or apparatuses for providing an electronic signal for the surveillance and/or testing of Geiger-Muller tube based radiation sensors.

Description of Related Art

Government regulations of commercial nuclear power plants require the periodic surveillance of safety equipment installed at, or located within, the nuclear power plant to ensure that the safety equipment is functioning properly. The safety equipment that may need to be surveilled may include sensors for detecting radiation, such as Geiger-Muller (GM) tube-based sensors.

Existing radiation sensors that use GM tubes do not allow for indirect and/or remote operational and/or performance testing of the GM tubes. Instead, GM tube-based sensors must be inspected manually by human personnel by placing a radiation source within the vicinity of the GM tube and analyzing the response of the GM tube-based sensor to the radiation source. This testing method may be undesirable because it exposes human personnel to unnecessary radiation. Further, GM tube-based radiation sensors may be located, permanently or otherwise, in physically inaccessible, inconvenient, and/or physically dangerous to access locations, such as radioactive seam lines in nuclear power plants. In these types of situations, it may be difficult and/or inconvenient to access the radiation sensor in order to test the radiation sensor. Also, conventional testing methods may require additional personnel to complete the testing as the radiation sensor's radiation monitor (e.g., display panel) may be located at a control facility and may not be located at the location of the radiation sensor. Thus, two or more employees may be needed in order to test a single radiation sensor, thereby increasing the testing cost and reducing employee productivity. Additionally, because the surveillance of the radiation sensors is conducted manually, testing of the radiation sensors may only occur on a periodic, instead of continuous, basis. With only periodic testing of radiation sensors, there may be a lengthy delay in the time it takes to repair and/or replace a malfunctioning radiation sensor because the malfunction of the radiation sensor may not be detected immediately.

SUMMARY

At least one example embodiment relates to a system for remotely monitoring the operation of a radiation sensor.

In at least one example embodiment, a system for remotely monitoring the operation of a radiation sensor may include a radiation sensor configured to detect a presence of radiation in the area, the radiation sensor including a Geiger-Muller tube, a test signal generator configured to generate a high frequency test signal used to test the radiation sensor, the high frequency test signal transmitted to the radiation sensor, and a test signal detector configured to detect a response of the radiation sensor to the test signal, and determine whether the radiation sensor is operating correctly.

Some example embodiments provide that the test signal detector may be configured to output an operational signal indicating that the radiation sensor is operating correctly if the response of the radiation sensor corresponds to amplitude and frequency of the high frequency test signal.

Some example embodiments provide that the test signal detector may be configured to output an operational signal indicating that the radiation sensor is operating incorrectly if the response of the radiation sensor does not correspond to amplitude and frequency of the high frequency test signal.

Some example embodiments provide that the test signal detector may be configured to output an operational signal indicating that the Geiger-Muller tube is leaking gas if amplitude of the response of the radiation sensor is lower than amplitude of the high frequency test signal.

Some example embodiments provide that the test signal detector may be configured to output an operational signal indicating that the anode or cathode of the Geiger-Muller tube is damaged if amplitude of the response of the radiation sensor is higher or lower than amplitude of the high frequency test signal.

Some example embodiments provide that the test signal detector may be configured to output an operational signal indicating damage to electrical wiring of the system has occurred if the test signal detector detects no response from the radiation sensor.

Some example embodiments provide that the high frequency test signal frequency may be equal to or greater than 20 KHz.

Some example embodiments provide that the test signal generator and test signal detector may be connected to the radiation sensor.

Some example embodiments provide that the test signal generator and test signal detector may be connected to a surveillance monitor, the surveillance monitor including a display.

At least one example embodiment relates to a method of remotely monitoring the operation of a radiation sensor.

In at least one example embodiment, a method of remotely monitoring the operation of a radiation sensor may include generating a high frequency test signal to test a radiation sensor configured to detect the presence of radiation, the radiation sensor including a Geiger-Muller tube, transmitting the high frequency test signal, detecting a response of the radiation sensor to the test signal, and determining whether the radiation sensor is operating correctly based on the response of the radiation sensor to the test signal.

Some example embodiments provide that an operational signal may be outputted indicating that the radiation sensor may be operating correctly if the response of the radiation sensor corresponds to amplitude and frequency of the high frequency test signal.

Some example embodiments provide that an operational signal may be outputted indicating that the radiation sensor may be operating incorrectly if the response of the radiation sensor does not correspond to amplitude and frequency of the high frequency test signal.

Some example embodiments provide that an operational signal may be outputted indicating that the Geiger-Muller tube may be leaking gas if amplitude of the response of the radiation sensor is lower than amplitude of the high frequency test signal.

Some example embodiments provide that an operational signal may be outputted indicating that the anode or cathode of the Geiger-Muller tube may be damaged if amplitude of the response of the radiation sensor is higher or lower than amplitude of the high frequency test signal.

Some example embodiments provide that an operational signal may be outputted indicating that damage to electrical wiring of the system may have occurred if the test signal detector detects no response from the radiation sensor.

Some example embodiments provide that the generating may include the high frequency test signal frequency may be equal to or greater than 20 KHz.

At least one example embodiment relates to an apparatus for monitoring the operation of a radiation sensor.

In at least one example embodiment an apparatus for monitoring the operation of a radiation sensor may include a test signal generator configured to generate a high frequency test signal used to test the radiation sensor, the high frequency test signal transmitted to the radiation sensor, a test signal detector configured to detect a response of the radiation sensor to the test signal, and determine whether the radiation sensor may be operating correctly.

Some example embodiments provide that the apparatus may include a first cable connecting the test signal generator and the test signal detector to the radiation sensor, the radiation sensor including a Geiger-Muller tube, a second cable connecting the test signal generator and the test signal detector to the surveillance monitor, the surveillance monitor including a display, and wherein the high frequency test signal may be transmitted from the test signal generator to the radiation sensor via the first cable.

Some example embodiments provide that the test signal generator and the test signal detector may be attached to the surveillance monitor.

Some example embodiments provide that the test signal generator and the test signal detector may be attached to the radiation sensor.

BRIEF DESCRIPTION OF THE DRAWINGS

The various features and advantages of the non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable techniques including memory sharing, message passing, token passing, network transmission, etc.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc., that performs particular tasks or implement particular data types. The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits, field programmable gate arrays (FPGAs) computers or the like.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1:
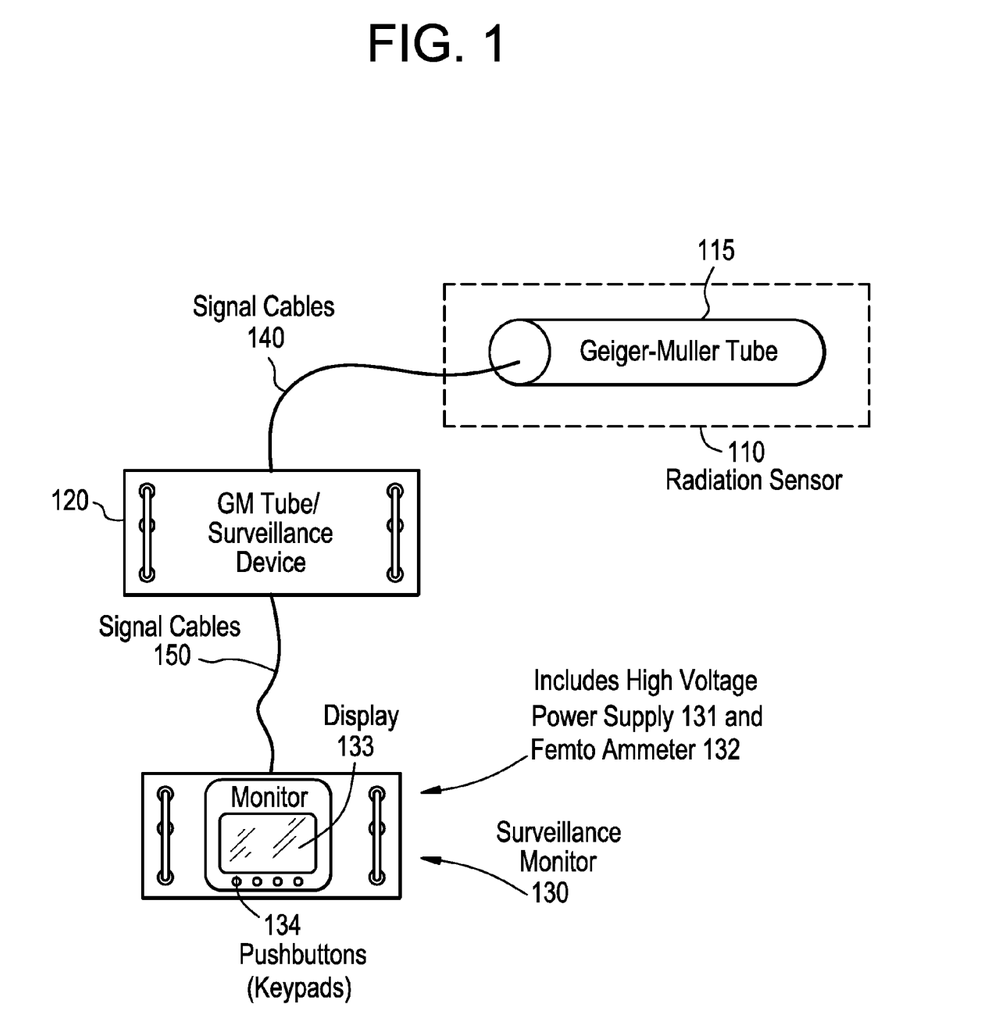
FIG. 1 illustrates a system for remotely monitoring the operation of a radiation sensor, according to an example embodiment.

FIG. 1 illustrates a system for remotely monitoring the operation of a radiation sensor, according to an example embodiment. The radiation sensor remote monitoring system 100 may include a radiation sensor 110, including a GM tube 115, GM tube surveillance device 120, surveillance monitor 130, and signal cables 140 and 150.

According to various example embodiments, the GM tube 115 may be used with, integrated within, or otherwise connected to a radiation sensor. The GM tube 115 may include an enclosure that may be filled with a gas mixture that may be at a pressure that is less than atmospheric pressure. The gas mixture may include a "counting" gas, such as argon, and a "quenching" gas, such as bromine or other halogen gases. The GM tube enclosure may be made out of a conducting material, such as stainless steel, or may comprise any material that has its interior surface coated with a conducting material. The conducting material of the enclosure and/or the enclosure itself may act as a cathode electrode. The enclosure may be a hollow thin wall that may be sealed and insulated from a small diameter collecting center conductor wire that may act as an anode electrode. The collecting center conductor wire may be made from a conducting material, such as stainless steel. The collecting center conductor wire may be positioned coaxially inside the cathode electrode. The GM tube 115 may additionally include glass insulators at both ends of the cylindrical enclosure.

In various embodiments, a high voltage potential may be applied between the cathode and anode electrodes in order to create a strong electric field within the GM tube 115. When ionizing radiation strikes the GM tube 115, i.e., when radiative particles from a radiation source enters the GM tube 115 enclosure, certain molecules of the gas mixture within the enclosure may become ionized directly by the incident radiation and may create positively charged "ion-pairs." This is called a primary ionizing event. Additionally, an avalanche of secondary ion pairs may be created when the positively charged ion pairs from the primary ionizing event are accelerated by the strong electric field within the enclosure towards the negatively charged anode, the movement of the primary ionizing event ion-pairs ionizing additional gas molecules within the entire volume of the enclosure. The collected ionic charge of the ion-pairs may generate an output electrical pulse. Thus, the GM tube 115 may output an electrical pulse of several volts or more with a uniform amplitude, regardless of the number of ion-pairs formed within the detector by the radiation causing the primary ionizing event.

During the ionization events, collisions occur between the counting gas molecules and the quench gas molecules in the gas mixture of the GM tube 115. The collisions transfer the positive charge from the counting gas molecules to the quench gas molecules. As a result, the positive charge transfer collisions assure that all of the positive ions that eventually arrive at the cathode electrode are quench gas molecules. When the positively charged quench gas molecules reach the cathode electrode, the quench gas molecules are neutralized by electrons from the cathode. The electron's excess energy, after neutralizing the quench gas molecule charge, is expended by disassociating the more complex quench gas molecules in preference to liberating a free electron from the surface of the cathode. Consequentially, the probability of disassociation of the quench gas molecule is much greater than the production of electron emission to initiate further ionization, and thus the discharge within the GM tube comes to a completion. Because there is a disassociation of the quench gas molecules that occurs after an ionization event, i.e., after the detection of radiation, the GM tube 115 loses quench gas, which in turn limits the "counting" life of the GM tube 115. Commercial GM tubes generally have a lifespan of 10 to 15 years.

In addition to the gradual diminishment and eventual failure of the GM tube 115 due to the disassociation of the quench gas molecules, the GM tube may fail, malfunction and/or otherwise perform incorrectly due to other factors, such as leakage of the gas mixture from the sealed GM tube enclosure, or the loss of GM cathode passivation.

For example, a GM tube 115 may become mechanically stressed during production of the GM tube and/or the production of the GM tube-based radiation sensor. The mechanical stress to the GM tube may cause the development of a micro-crack in the glass-metal seal at either end of the GM tube 115. Development of a micro-crack in the glass-metal seal may result in a very slow leakage of the counting gas and quench gas in the GM tube enclosure, and may also introduce foreign gas molecules (e.g., air) into the enclosure volume. The very slow disappearance of the counting gas and quench gas from the GM tube enclosure volume can temporarily establish conditions within the GM tube that will significantly increase the length of "dead-time" and will eventually lead to the complete failure of the GM tube and/or the radiation sensor. Additionally, a significant increase in dead-time will mask out some of the closely spaced ionizing events that occur at high radiation levels and cause the GM tube to respond nonlinearly.

Dead-time is a term used to describe the interval of time between the start of an ionization event that develops into an avalanche discharge and the time when the ionization within the GM tube has dissipated back to a level that permits the electric field within the GM tube to be sufficiently restored for a subsequent ionizing event to trigger the next normal-sized avalanche discharge. If a subsequent ionizing event occurs during the dead-time of the previous ionizing event, i.e., if another radioactive particle strikes the GM tube during the dead-time, the electric field will not have been sufficiently restored and the resulting discharge will have a lesser intensity than the original discharge. Consequently, the amplitude of the output pulse from subsequent ionizing events during the dead-time will be diminished because fewer positive ions are required to terminate the discharge by transferring the positive charge from the counting gas molecules to the quench gas molecules. An output electrical pulse generated during the dead-time by the subsequent ionizing events will have a smaller amplitude in comparison to the original output electrical pulse and may have an amplitude that is not large enough to pass a detection threshold level used by conventional radiation sensors that is used to exclude false positive signatures from actual radiation detection signatures.

More importantly, a GM tube failure mode that results in a measurably longer dead-time will indicate nearly normal operation for the low levels of radiation from radioactive test sources commonly used in manual testing of radiation sensors. Radiation from the test source may cause a very low radiation count rate due to infrequently occurring ionizing events and the statistical probability that very few ionizing events will occur during a measurably longer dead-time due to a micro-crack, leakage, and/or reduction of the counting gas and quench gas from the GM tube. Essentially all of the output pulses caused by the low level test source will be above the threshold level of detection and will prevent the GM tube/radiation sensor malfunction from being observed. However, in the event that there is a radiation source involving higher radiation levels around the malfunctioning GM tube/radiation sensor, the higher level radiation will statistically have a much higher probability of causing more ionizing events to occur during the intervals of the longer dead-times. And because a significant portion of the additional ionizing events will occur during the longer dead-time period, the radiation sensor will continue to generate output pulses with amplitudes below the threshold level of detection and the higher radiation levels may result in a misleading indication that shows a response that is lower than the actual radiation level.

As another example of a failure mode for a GM tube, there may be a loss of GM cathode passivation during the construction, manufacture, and/or fabrication of a GM tube. Before a GM tube is constructed, the inside of the hollow thin wall stainless steel cylinder cathode is chemically passivated by developing a chrome oxide that forms a thin protective film on the inside surface of the cathode electrode. Formation of the protective film on the inside surface protects against further chemical reactions between the enclosure and the gas mixture that fills the enclosure. An unprotected metal surface is very susceptible to halogen ions that are formed during ionization events and, if left unprotected, will lead to chemical reactions that form halogen-metal compounds on the interior surface of the metal enclosure. Passivation of the inside surface of the GM tube metal cathode is another critical technique to prevent the loss of the halogen quench gas inside the GM tube. Loss of the halogen quench gas may also measurably increase the length of dead-time in the GM tube, which will mask out the closely spaced ionizing events that occur during the dead-time, thereby causing the GM tube to respond nonlinearly at high radiation levels, as discussed in detail above.

As part of the manufacturing process of the GM tube, high temperature melted glass may be placed at both ends of the thin wall metal cylinder cathode and then may be allowed to cool during the manufacture of the GM tube. This step is taken in order to seal the gas mixture inside the GM tube volume and to insulate the wire anode that is positioned coaxially inside the cathode. Applying heat in this manner to the GM tube may cause the passive protective film on the inside surface of the cylindrical cathode to degrade. Any loss of the passive protective film will make the valance electrons on the exposed metal surface available for chemical reactions with other elements exposed to the metal surface. A cathode that is subjected to too much excessive heat, or heat over an extended period when the melted glass is placed at both ends of the cathode during fabrication, degrades and/or partially destroys the protective passive film and leaves the inside metal surface of the cathode unprotected. The unprotected inside metal surface of the cathode will chemically react with halide ions and gradually deplete the quench gas from the volume of the GM tube enclosure. Eventually, the gradual depletion of the quench gas will initiate the onset of increased length dead-time and will lead to the increase of the dead-time period. As a result, the loss of some of the quench gas will cause the GM tube to provide a nearly normal (i.e., proper and/or expected) detection response for low radiation levels, but will cause the GM tube to respond nonlinearly at higher radiation levels.

Another problem faced in attempting to detect the loss of GM cathode passivation is the issue where GM tubes that experience degradation and/or partial destruction of the protective passive film will respond correctly immediately after fabrication. There may be a relatively lengthy time period, e.g., a year or more, before the halide quench gas ions chemically react with enough of the interior metal cylindrical cathode to cause sufficient depletion of the halide quench gas to measurably increase the length of the dead-time period for the GM tube. Thus, a GM tube-based radiation sensor may appear to be in proper operational condition when initially installed or manufactured, but may actually be suffering a failure mode not experience a significant increase in the length of dead-time until months after installation into a radiation sensor or after it has been placed into storage as a spare part.

Referring back to FIG. 1, the system for remotely monitoring the operation of a radiation sensor 100 may further include a GM tube surveillance device 120. The GM tube surveillance device 120, to be discussed in further detail in connection with FIG. 2, may be connected to one or more GM tubes and/or radiation sensors via signal cable 140. The GM tube surveillance device 120 may also be connected to a surveillance monitor 130 and/or a radiation monitor (not shown) via a second signal cable 150. The signal cables may be coaxial cable, a data cable, a twisted pair cable, a fiber optic cable, or the like. The surveillance device 120 may transmit a signal to the radiation sensor 110 and, in response to the transmitted signal, may receive signals that may be used to determine the operating condition of the radiation sensor 110 and/or GM tube 115. Once the response signal from the radiation sensor 110 is received by the surveillance device 120, the surveillance device may analyze the response signal and determine the current operating status of the radiation sensor 110 and/or GM tube 115 a (i.e., determine whether the GM tube and the radiation sensor is operating correctly, or determine a failure mode of the GM tube or the radiation sensor). After determining the current operating status of the radiation sensor 110 and/or GM tube 115, the surveillance device 120 may then transmit via signal cable 150 the operating status and/or failure mode data to surveillance monitor 130 and/or a computing system (not shown) for display and further action.

Additionally, in various example embodiments, the surveillance device 120 may include a physical computer hardware device capable of communicating with one or more other hardware computing devices (e.g., surveillance monitor 130 and/or GM tube 115) via a communications interface. The surveillance device 120 may also include a network interface configured to connect the surveillance device to one or more other hardware computing devices (e.g., a computing system, such as a server, workstation, laptop, smartphone, tablet, or the like) wirelessly via a transmitter and a receiver (or optionally a transceiver) and/or via a wired connection using a communications port. The surveillance device 120 may be configured to send/receive data to/from one or more other hardware computing devices, and/or network devices, such as a router, switch, or other like network devices, via the network interface using the wired connection and/or the wireless connection. The wireless transmitter/receiver and/or transceiver may be configured to operate in accordance with the IEEE 802.11-2007 standard (802.11), the Bluetooth standard, and/or any other like wireless standards. The communications port may be configured to operate in accordance with a wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols). The surveillance device 120 may be configured to transmit or otherwise communicate generated surveillance data corresponding to the operation of the radiation sensor 110 and/or GM tube 115 to the one or more other hardware computing devices via the network interface.

In various example embodiments, the system for remotely monitoring the operation of a radiation sensor 100 may include a surveillance monitor 130. The surveillance monitor 130 may also include a display 133 that may be configured to display at least information regarding the results of the surveillance of one or more radiation sensors received from the surveillance monitor 130. The surveillance monitor 130 may also include user input controls 134 (e.g., pushbuttons, keypad, or the like) for controlling the surveillance monitor 130, the surveillance device 120, and/or the radiation sensor 110.

The surveillance monitor 130 may also include a radiation monitor (not shown) that may analyze, interpret and display data regarding the radiation detected by the GM tube-based radiation sensor. The surveillance monitor 130 may include a high voltage power supply (not shown) and a femto ammeter (not shown). The high voltage power supply may be configured to supply a high voltage (e.g., 300-600 VDC) to the GM tube 115, which will charge the anode electrode of the GM tube 115 to create the strong electric field in the GM tube enclosure discussed above. The femto ammeter may be configured to detect the current within the closed circuit of the system 100, and thereby detect an ionization event detected by the GM tube 115. Alternatively, the radiation monitor may be separate from the surveillance monitor 130. The surveillance monitor 130 may be attached to the surveillance device 120 and/or a mobile GM tube-based radiation sensor 110. Additionally, and/or alternatively, the surveillance monitor 130 may be located in a physically separate location from the radiation sensor 110, such as in a control room, operations room, or the like.

According to various example embodiments, the computing system (not shown) is a physical hardware computing device capable of communicating with one or more other hardware computing devices (e.g., surveillance device 120, surveillance monitor 130, one or more associated databases (not shown), and the like) via a communications interface, such that computing system may be able to receive one or more signals and/or data streams from the other hardware computing devices. Computing system may include memory and one or more processors. Computing system may be designed to sequentially and automatically carry out a sequence of arithmetic or logical operations; equipped to record/store data on a machine readable medium; and transmit and receive data via one or more network devices. Computing system may include devices such as desktop computers, laptop computers, a mobile terminal (e.g., tablet personal computers and the like), and/or any other physical or logical device capable of recording, storing, and/or transferring digital data via a connection to a network device.

In various example embodiments, the computing system may include a network interface configured to connect the computing system to one or more other hardware computing devices (e.g., surveillance device 120, surveillance monitor 130, one or more associated databases (not shown), etc.) wirelessly via a transmitter and a receiver (or optionally a transceiver) and/or via a wired connection using a communications port. Computing system may be configured to send/receive data to/from one or more other hardware computing devices, and/or network devices, such as a router, switch, or other like network devices, via the network interface using the wired connection and/or the wireless connection. The wireless transmitter/receiver and/or transceiver may be configured to operate in accordance with the IEEE 802.11-2007 standard (802.11), the Bluetooth standard, and/or any other like wireless standards. The communications port may be configured to operate in accordance with a wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols). The computing system may be configured to store information regarding the current status of one or more GM tube-based radiation sensor and may alert personnel regarding the failure of a GM tube in a radiation sensor, the need to repair and/or replace a GM tube in a radiation sensor or cabling connecting a radiation sensor to a radiation monitor and/or surveillance monitor, and/or provide a historical performance log of the radiation sensors, or the like.

As shown in FIG. 1, only one radiation sensor 110, one surveillance device 120, and one surveillance monitor 130 are present. However, according to various example embodiments, any number of radiation sensors, surveillance devices, surveillance monitors, radiation monitors, and/or computing systems may be present. Additionally, in various example embodiments, radiation sensor 110, surveillance device 120, surveillance monitor 130, radiation monitor and/or a computing system may be wirelessly networked devices. Additionally, or alternatively, in various example embodiments, the radiation sensor 110, one surveillance device 120, and one surveillance monitor 130 and/or radiation monitor may be provided as a single apparatus. Further, while in various example embodiments components of the radiation sensor 110, surveillance device 120, surveillance monitor 130 and/or radiation monitor may be described and illustrated as residing within the radiation sensor 110, surveillance device 120, surveillance monitor 130 and/or radiation monitor, it should be understood that this is not required and that the individual components may be located and/or included in one or more of the other components of the system for remotely monitoring the operation of a radiation sensor 100.

Figure 2:
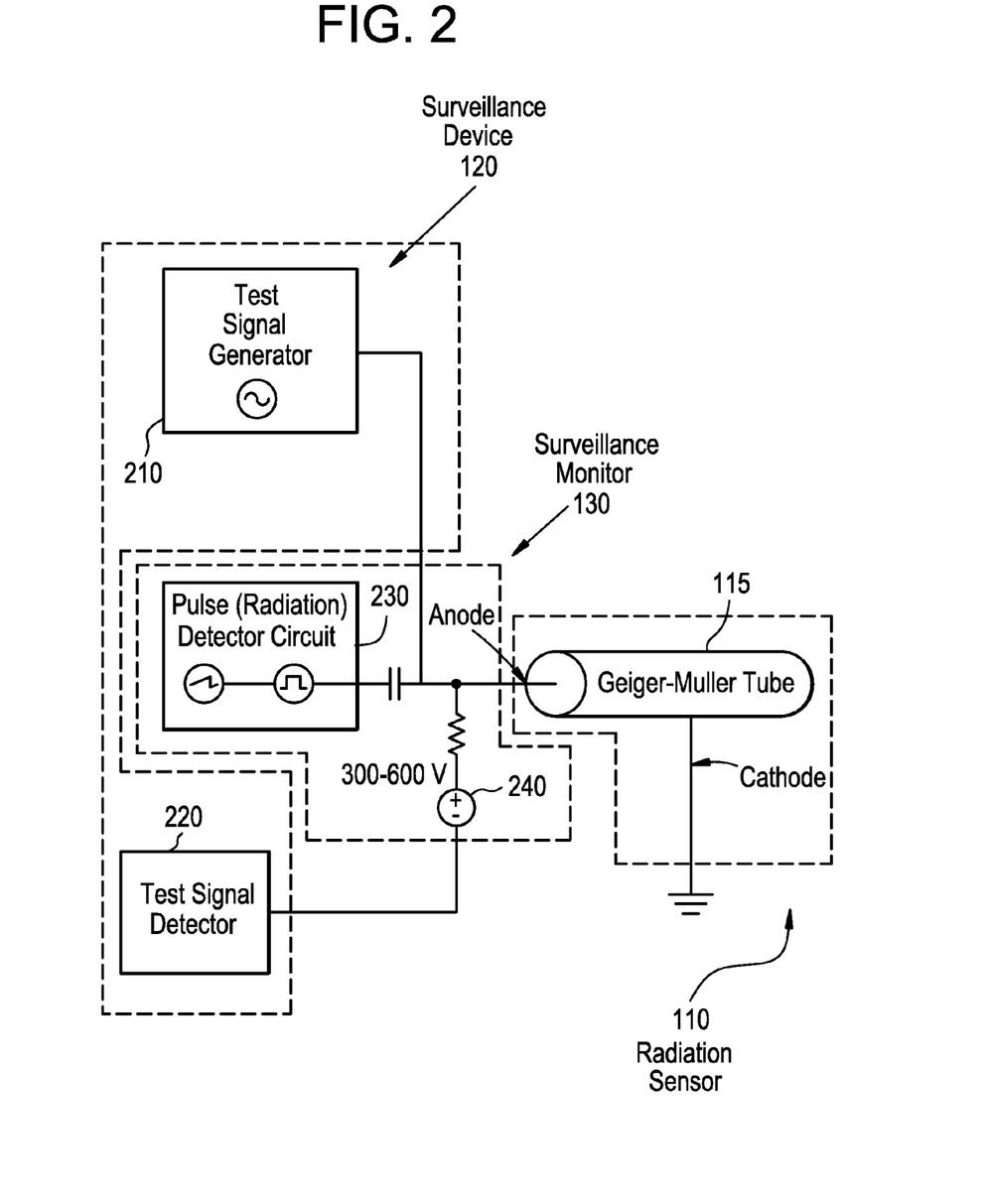
FIG. 2 illustrates the components of an apparatus for remotely monitoring the operation of a radiation sensor that may be employed by the system of FIG. 1, according to an example embodiment.

FIG. 2 illustrates the components of radiation sensor 110, surveillance device 120, and surveillance monitor 130, according to an example embodiment.

In various example embodiments, the surveillance device 120 may include a test signal generator 210 that may be connected to the anode electrode of a GM tube 115 and a test signal detector 220 that may be connected to the cathode anode of GM tube 115. The test signal generator 210 may be configured to generate a high frequency test signal that may be used to test the radiation sensor 110. More specifically, the test signal generator 210 may generate a high frequency test signal that is transmitted to the anode electrode of the GM tube 115. The test signal generator 210 may be a function generator and the test signal detector 220 may be an oscilloscope. If the GM tube is operating properly, the test signal detector 220 will detect the test signal at the same, or substantially similar, frequency as had been generated by the test signal generator 210. The high frequency test signal may be continuously generated and transmitted by the test signal generator 210 in order to continuously monitor the GM tube 115 and/or radiation sensor 110. Additionally, the high frequency test signal may be generated and transmitted at a periodic interval, or on demand, in order to test the GM tube 115. In order to differentiate the high frequency test signal from the signal that a properly functioning GM tube in a radiation sensor produces during normal operation, which typically is a low frequency DC signal, the test signal generator 210 may be configured to generate a test signal that is of such a high frequency that it is distinguishable from the normal GM tube frequency. For example, the test signal generator may generate test signals that may be equal to or greater than 20 KHz. The test signal frequency to be generated may be dependent on the size of the GM tube used in the radiation sensor 110.

In some example embodiments, the test signal detector 220 may be configured to detect and analyze the high frequency test signal transmitted by the test signal generator 210 and transmitted through the GM tube 115. As discussed above, if the GM tube 115 is operating correctly, then the signal detected by the test signal detector 220 will be the same, or substantially similar, frequency as had been generated by the test signal generator 210. However, if the GM tube is not operating correctly, the signal detected by the test signal detector 220 will have a different characteristic than the test signal generated and transmitted by the test signal generator 210. For example, if the detected test signal's amplitude is lower than expected, then the GM tube may be leaking gas because the electrical characteristic of the GM tube has changed. If the detected test signal's amplitude is positively or negatively changed (i.e., the polarity of the test signal has been reversed), then the electrodes of the GM tube may have been damaged. If the wiring and/or cabling of the radiation sensor 110 and/or the radiation monitoring system 100 has been damaged, then the test signal detector will not detect the test signal because there will be an open circuit in the closed system of the radiation monitoring system 100.

Therefore, accordingly to at least one example embodiment, the test signal detector 220 may be configured to determine whether the detected signal is within an acceptable and/or desired range of frequency values and output the results of the determination to the surveillance monitor 130 and/or the computing system, the acceptable and/or desired range of frequency values based on the frequency of the generated test signal. For example, an acceptable range of frequency values may be within a desired deviation (e.g., +/−10%) of the frequency of the generated test signal. The acceptable and/or desired range of frequency values may be determined according to an empirical study of various GM tube models available, or may be configured for a specific GM tube model. The acceptable and/or desired range of frequency values may be expressed as a percentage of deviation, or as absolute values of the minimum and maximum frequency acceptable and/or desired. Additionally, the test signal detector 220 may be configured to determine whether the detected signal is above an acceptable and/or desired threshold value, the threshold value established so that the test signal detector 220 may determine whether the GM tube is functioning properly or not based on a comparison of the frequency of the detected test signal and the threshold value. For example, the threshold value may be set to a value that is −10% of the frequency of the generated test signal, and if the detected test signal is greater than the threshold value, the test signal detector determines that the GM tube is functioning properly. The acceptable and/or desired threshold value may be a design parameter that is determined based on an empirical study of various GM tube models available, or may be determined for a specific GM tube model.

Additionally, the test signal detector 220 may be configured to detect the voltage of the high frequency test signal in order to determine whether the GM tube is leaking gas and then to output the results of the determination to the surveillance monitor 130 and/or the computing system. The test signal detector 220 may be configured to detect whether the detected signal is within an acceptable and/or desired range of voltage values, the acceptable and/or desired range of voltage values based on the voltage of the generated test signal. For example, an acceptable range of voltage values may be within a desired deviation (e.g., +/−10%) of the voltage of the generated test signal. The acceptable and/or desired range of voltage values may be determined according to an empirical study of various GM tube models available, or may be configured for a specific GM tube model. The acceptable and/or desired range of voltage values may be expressed as a percentage of deviation, or as absolute values of the minimum and maximum frequency acceptable and/or desired. Additionally, the test signal detector 220 may be configured to determine whether the detected signal is above an acceptable and/or desired threshold voltage value, the threshold value established so that the test signal detector 220 may determine whether the GM tube is leaking gas or not based on a comparison of the voltage of the detected test signal and the threshold value. For example, the threshold value may be set to a value that is −10% of the voltage of the generated test signal, and if the detected test signal is greater than the threshold value, the test signal detector determines that the GM tube is not leaking gas. The acceptable and/or desired threshold value may be a design parameter that is determined based on an empirical study of various GM tube models available, or may be determined for a specific GM tube model.

The test signal detector 220 may also be configured to detect whether the electrodes of the GM tube have been damaged by comparing the polarity of the detected test signal with the polarity of the generated test signal and then to output the results of the determination to the surveillance monitor 130 and/or the computing system. For example, if the polarity of the generated test signal is positive and the polarity of the detected test signal is negative, then the test signal detector determines that the electrodes of the GM tube has been damaged and outputs the result to the surveillance monitor 130 and/or the computing system.

The test signal detector 220 may also be configured to detect whether the wiring and/or cabling of the radiation sensor 110 and/or the radiation monitoring system 100 has been damaged. For example, the test signal detector 220 may be configured to receive an indication that the testing of the GM tube has commenced, such as an indication that the test signal generator has generated and transmitted a test signal, and may be further configured to determine whether the test signal detector test signal has been detected within an acceptable and/or desired time period after the commencement of the test. If the test signal is not detected within the acceptable and/or desired time period, the test signal detector may be configured to determine that the wiring and/or cabling of the radiation sensor 110 and/or radiation monitoring system 100 has been damaged and may output the result to the surveillance monitor 130 and/or the computing system. For example, the acceptable time period to detect the test signal may be set to 1 second or less. The acceptable and/or desired time period may be a design parameter that is determined based on an empirical study of the electrical characteristics of various GM tube models available, or may be determined for a specific GM tube model.

The above test signal detector determinations have been provided for illustrative purposes only and the test signal detector 220 is not limited thereto. The test signal detector 220 may be configured to monitor and/or test for additional types of failure modes as well.

Once the test signal detector 220 determines the current operating status and/or the type of failure mode of the radiation sensor 110, the test signal detector 220 may output the results of the determination to the surveillance monitor 130.

In various example embodiments, the surveillance monitor 130 may include a radiation (or pulse) detector circuit 230 and a high voltage power supply 240. The radiation detector circuit 230 may be configured to determine the level of radiation, i.e., "count" the radiation, detected by the GM tube 115 by determining the number of output pulses generated by the GM tube 115 following ionizing events. The radiation detector circuit 230 may be configured to only count output pulses that have an amplitude greater than a configurable detection threshold level.

As discussed above, the surveillance monitor 130 may also include a high voltage power supply 240 that creates, at least in part, the strong electric field within the GM tube 115.

Figure 3:
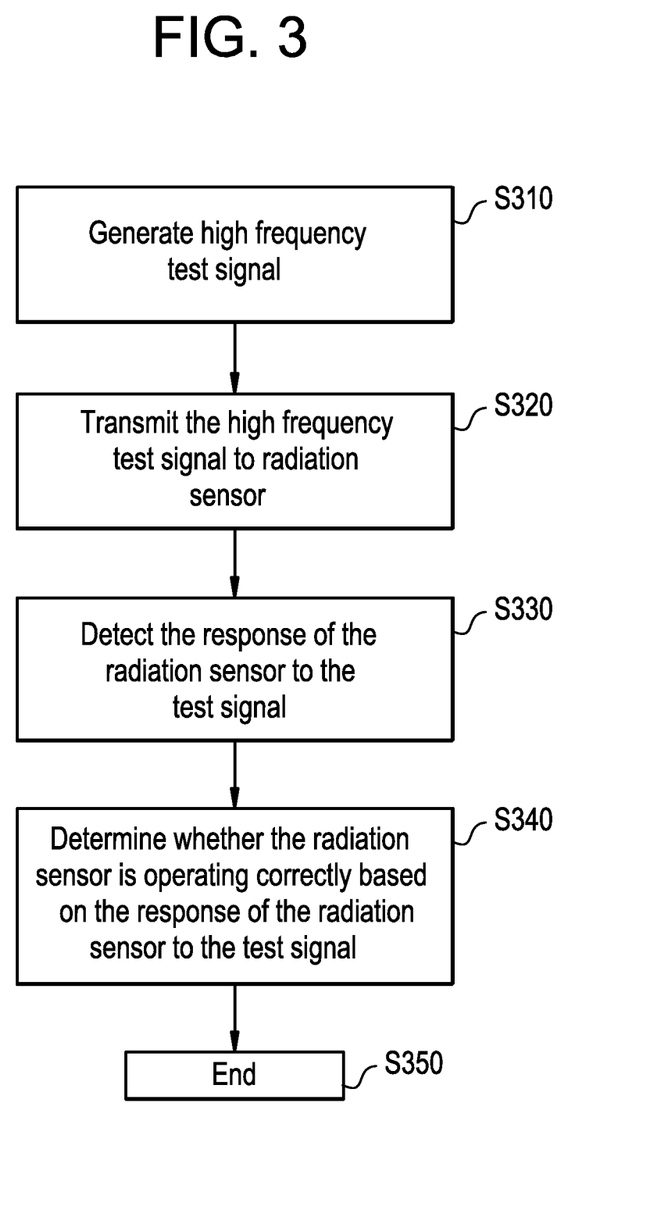
FIG. 3 illustrates a routine for remotely monitoring the operation of a radiation sensor, according to an example embodiment.

FIG. 3 illustrates a routine for remotely monitoring the operation of a radiation sensor, according to an example embodiment. The routine may be used to remotely monitor the operational status of a radiation sensor, such as the radiation sensor 110, using a surveillance device 120. While the operations of the routine will be described as being performed by the system and apparatus of FIGS. 1-2, it should be noted that any monitoring system may operate the monitoring routine of FIG. 3 as described below.

Referring to FIG. 3, as shown in operation S310, test signal generator 210 may generate a desired high frequency test signal. In operation S320, the high frequency test signal may be transmitted to the radiation sensor 110. In operation S330, the test signal detector 220 may detect the response of the radiation sensor to the test signal. In operation S340, the test signal detector 220 may determine whether the radiation sensor is operating correctly based on the response of the radiation sensor to the test signal.

As shown in operations S350, the remote monitoring routine ends.

As will be appreciated, the technical effect of the methods, systems and/or apparatuses according the example embodiments allows for the remote monitoring, testing and/or surveillance of Geiger-Muller tube-based radiation sensors, especially for Geiger-Muller tube-based radiation sensors located in physically inconvenient and/or inaccessible locations. Various example embodiments may also provide an ability to survey Geiger-Muller tube-based radiation sensors without exposing human personnel to unnecessary radiation dosage. Various example embodiments may also provide faster detection of the non-optimal operation of radiation sensors and/or failure in order to provide a better Mean Time to Repair (MTR) for Geiger-Muller tube-based radiation sensors, especially through the use of continuous monitoring of Geiger-Muller tube-based radiation sensor. Various example embodiments may further provide a less expensive operation for surveying Geiger-Muller tube-based radiation sensors.

It should be noted that although the example embodiments may be described in connection with nuclear safety related systems, the example embodiments may also apply to any industry where radiation detection sensors and/or Geiger-Muller tubes may be used or required. Such industries may include nuclear engineering, forensic engineering, mechanical engineering, electrical engineering, civil engineering, systems engineering, aeronautical engineering, nautical engineering, astronautical engineering, medicine, scientific research and/or any other like disciplines that deal with the use, design, construction, examination, and/or maintenance of objects relating to radioactive and/or potentially radioactive materials or locations.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed:

1. A system for remotely monitoring the operation of a radiation sensor, comprising:
   a radiation sensor configured to detect a presence of radiation in the area, the radiation sensor including a Geiger-Muller tube;
   a test signal generator configured to generate a high frequency test signal used to test the radiation sensor, the high frequency test signal transmitted to the radiation sensor; and
   a test signal detector configured to detect a response of the radiation sensor to the test signal, and determine whether the radiation sensor is operating correctly.

2. The system of claim 1, wherein the test signal detector is configured to output an operational signal indicating that the radiation sensor is operating correctly if the response of the radiation sensor corresponds to amplitude and frequency of the high frequency test signal.

3. The system of claim 1, wherein the test signal detector is configured to output an operational signal indicating that the radiation sensor is operating incorrectly if the response of the radiation sensor does not correspond to amplitude and frequency of the high frequency test signal.

4. The system of claim 1, wherein the test signal detector is configured to output an operational signal indicating that the Geiger-Muller tube is leaking gas if amplitude of the response of the radiation sensor is lower than amplitude of the high frequency test signal.

5. The system of claim 1, wherein the test signal detector is configured to output an operational signal indicating that the anode or cathode of the Geiger-Muller tube is damaged if amplitude of the response of the radiation sensor is higher or lower than amplitude of the high frequency test signal.

6. The system of claim 1, wherein the test signal detector is configured to output an operational signal indicating damage to electrical wiring of the system has occurred if the test signal detector detects no response from the radiation sensor.

7. The system of claim 1, wherein the high frequency test signal frequency is equal to or greater than 20 KHz.

8. The system of claim 1, wherein the test signal generator and test signal detector are connected to the radiation sensor.

9. The system of claim 1, wherein the test signal generator and test signal detector are connected to a surveillance monitor, the surveillance monitor including a display.

10. A method of remotely monitoring the operation of a radiation sensor, comprising:
    generating a high frequency test signal to test a radiation sensor configured to detect the presence of radiation, the radiation sensor including a Geiger-Muller tube;
    transmitting the high frequency test signal;
    detecting a response of the radiation sensor to the test signal; and
    determining whether the radiation sensor is operating correctly based on the response of the radiation sensor to the test signal.

11. The method of claim 10, further comprising:
    outputting an operational signal indicating that the radiation sensor is operating correctly if the response of the radiation sensor corresponds to amplitude and frequency of the high frequency test signal.

12. The method of claim 10, further comprising:
    outputting an operational signal indicating that the radiation sensor is operating incorrectly if the response of the radiation sensor does not correspond to amplitude and frequency of the high frequency test signal.

13. The method of claim 10, further comprising:
    outputting an operational signal indicating that the Geiger-Muller tube is leaking gas if amplitude of the response of the radiation sensor is lower than amplitude of the high frequency test signal.

14. The method of claim 10, further comprising:
    outputting an operational signal indicating that the anode or cathode of the Geiger-Muller tube is damaged if amplitude of the response of the radiation sensor is higher or lower than amplitude of the high frequency test signal.

15. The method of claim 10, further comprising:
    outputting an operational signal indicating that damage to electrical wiring of the system occurred if the test signal detector detects no response from the radiation sensor.

16. The method of claim 10, wherein the generating includes the high frequency test signal frequency is equal to or greater than 20 KHz.

17. An apparatus for monitoring the operation of a radiation sensor, comprising:
    a test signal generator configured to generate a high frequency test signal used to test the radiation sensor, the high frequency test signal transmitted to the radiation sensor; and
    a test signal detector configured to detect a response of the radiation sensor to the test signal, and determine whether the radiation sensor is operating correctly.

18. The apparatus of claim 17, further comprising:
    a first cable connecting the test signal generator and the test signal detector to the radiation sensor, the radiation sensor including a Geiger-Muller tube;
    a second cable connecting the test signal generator and the test signal detector to the surveillance monitor, the surveillance monitor including a display; and
    wherein the high frequency test signal is transmitted from the test signal generator to the radiation sensor via the first cable.

19. The apparatus of claim 17, wherein the test signal generator and the test signal detector are attached to the surveillance monitor.

20. The apparatus of claim 17, wherein the test signal generator and the test signal detector are attached to the radiation sensor.

* * * * *